3,155,595
PREHEATING AND COOLING A NUCLEAR REACTOR SYSTEM

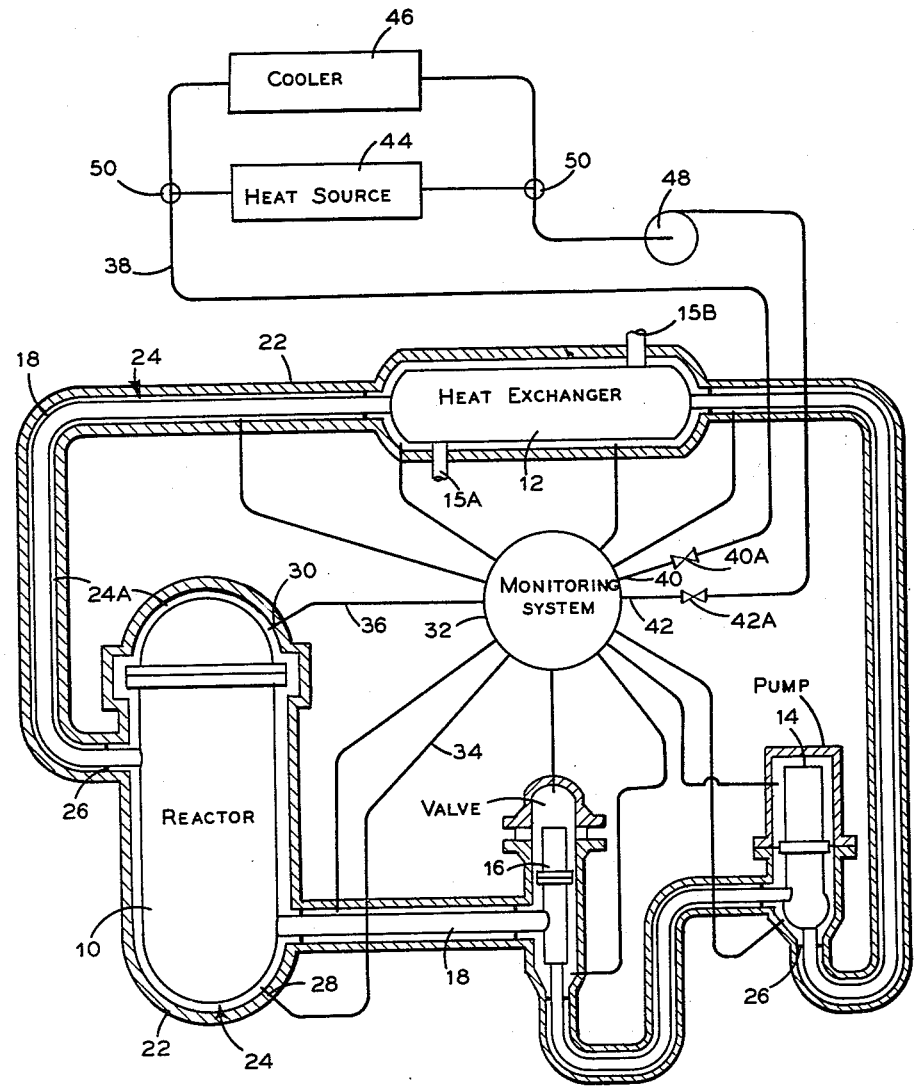

Donald C. Schluderberg, Lynchburg, Va., assignor to The Babcock & Wilcox Company, New York, N.Y., a corporation of New Jersey
Filed Dec. 4, 1959, Ser. No. 857,312
1 Claim. (Cl. 176—20)

This invention relates in general to a nuclear reactor and more particularly to apparatus for selectively preheating and cooling a nuclear reactor system.

Nuclear reactor systems operate at elevated temperatures. Before a reactor system can be placed in operation, it must be heated to its proper operating temperature. Further, after a reactor is shut down that has operated a considerable length of time, a certain amount of heat is produced due to fission product decay. This decay heat must be removed to avoid fuel and metal temperatures from rising to excessive levels.

Therefore, it is the purpose of the present invention to provide an arrangement whereby the various components which make up the nuclear reactor system can be either preheated or cooled. A closely fitting fluid-tight shell encloses the various nuclear reactor system components, and forms a flow space about them. A conduit system is connected to the shell to pass a heat transfer fluid through the flow space. Within the conduit system a heat source and a cooler are arranged in parallel so that the heat transfer fluid flowing therethrough may be either heated or cooled. Flow control means selectively direct the flow of the heat transfer fluid through the conduit system to either the heating source or to the cooler.

Various features of novelty which characterize the invention are pointed out with particularity in the claim annexed to and forming part of this specification. For a better understanding of the invention, its operating advantages and specific objects attained by its use, reference should be had to the accompanying drawing and descriptive matter in which a certain specific embodiment of the invention is illustrated and described.

The drawing is a schematic diagram of the present invention showing, in section, the pressure shell which encloses the reactor system.

Referring to the drawing, a nuclear reactor system is shown containing a nuclear reactor 10 and a heat exchanger 12 joined in a closed circuit by connecting piping 18. In addition, a pump 14 is positioned within the closed circuit to circulate a primary coolant therethrough and a valve 16 is arranged therein to control the flow of the primary coolant. The heat exchanger 12 has an inlet 15A and an outlet 15B for passing secondary fluid therethrough in heat transfer relationship with the primary coolant.

The entire reactor system is enclosed within an integral, closely fitting, fluid-tight shell 22 which forms a narrow flow space 24 about the system. Diaphragms 26 are positioned transversely across the flow space 24 attached to both the shell 22 and the oppositely disposed portion of the reactor system to divide the flow space into a number of fluid-tight compartments 24A. Each of the compartments 24A has an inlet connection 28 spaced from an outlet connection 30.

A monitoring system 32 is in communication with each of the compartments 24A through monitoring fluid inlet and outlet passageways 34, 36 (not all of which are shown in the drawing) connected respectively to the inlet and outlet connections 28, 30 of the compartments. Monitoring fluid is passed through the compartments 24A and then through the monitoring system to detect and signal the presence of any leakage in the reactor system.

For a more detailed description of the containment of the reactor system in combination with the monitoring system reference is made to the inventor's co-pending application Serial No. 761,074, filed September 15, 1958, now Patent No. 3,098,023, granted July 16, 1963.

A conduit system 38 is connected at its inlet end 40 and outlet end 42 to the monitoring system 32. Valves 40A, 42A are positioned at the inlet and outlet ends 40, 42 respectively to regulate the flow of monitoring fluid from the monitoring system through the conduit system. When circulated through the conduit system the monitoring fluid also acts as a heat transfer fluid. Within the conduit system 38 a heating source 44 and a cooler 46 are arranged in parallel. A pump 48 is arranged to circulate the heat transferring monitoring fluid through the conduit system, and a pair of three ported valves 50 are positioned to direct the monitoring fluid through either the heating source or the cooler.

If, for purposes of illustrating the operation of this arrangement, it is assumed that the reactor system is about to be started up, it can be preheated in the following manner. The valves 40A, 42A are opened to permit the flow of monitoring fluid to circulate through the conduit system 38. In the conduit system the three ported valves 50 are set to direct the monitoring fluid through the heating source 44 while by-passing the cooler 46.

As the monitoring fluid flows through the conduit system, it receives heat from the heating source and then passes back into the monitoring system. From the monitoring system the heated monitoring fluid is directed into the inlet passageways 34 from which it flows into the compartments 24A. Within the compartments 24A, the monitoring fluid gives up its heat to the reactor system and then returns to the monitoring system through the outlet passageways 36 to complete its cycle.

When the reactor system has been preheated to the proper temperature, the valves 40A and 42A are closed and the flow of monitoring fluid through the conduit system is discontinued. During the reactor operation, the monitoring fluid continues passing through the compartments 24A to detect and signal leakage. Again when the reactor is shut down the monitoring fluid is circulated through the conduit system, but this time passing through the cooler, which acts as a heat sink to dissipate the heat produced by fission product decay.

While the invention has been described in combination with a monitoring system, it will be readily understood that it could be used without the monitoring system. In this form a heat transfer fluid would be circulated through the conduit system and the flow space only during preheating or cooling of the reactor system and not during reactor operation as a monitoring fluid.

An example of a monitoring fluid which would also be a good heat transfer fluid is helium.

A variety of means could be utilized to heat the fluid which preheats the reactor system. Depending on the reactor system requirements, electric, steam or even integrally fired heaters could be used to heat the heat transfer fluid. The same is true of the cooler wherein either water, air or other well known cooling arrangement could be used.

The flow space has been illustrated and described as being divided into a number of compartments, while this is the preferred arrangement, the flow space would also operate effectively without being separated into individual compartments.

While in accordance with the provisions of the statutes I have illustrated and described herein the best form of the invention now known to me, those skilled in the art will understand that changes may be made in the form of apparatus disclosed without departing from the spirit of the invention covered by my claim, and that certain features of my invention may be sometimes used to advantage without a corresponding use of other features.

What is claimed is:

In a nuclear reactor primary coolant system having a closed circuit for the continuous circulation of a primary coolant fluid, said reactor primary coolant system comprising separate components including a reactor and a heat exchanger joined by connecting piping for the flow of primary coolant therethrough, a closely fitting fluid-tight shell enclosing both said components and connecting piping and having a configuration generally conforming to the shape of the contained components and piping and forming therebetween a narrow flow space, the invention comprising an apparatus for selectively preheating and cooling the individual components of said primary coolant system at start-up and shutdown respectively comprising a conduit system having its inlet and outlet connected to said shell and forming a closed circuit with said narrow flow space for circulating a heat transfer fluid therethrough, a heating source disposed in said conduit system, a cooler disposed in said conduit system in parallel with said heating source, and flow control means disposed in said conduit system for selectively directing the flow of said fluid through said heating source and cooler.

References Cited in the file of this patent

UNITED STATES PATENTS

| | | |
|---|---|---|
| 2,747,842 | Shataloff | May 29, 1956 |
| 2,793,812 | McDonald | May 28, 1957 |
| 2,810,689 | Wigner et al. | Oct. 22, 1957 |
| 2,815,321 | Wigner et al. | Dec. 3, 1957 |
| 2,841,545 | Zinn | July 1, 1958 |
| 2,874,106 | Hammond et al. | Feb. 17, 1959 |
| 2,997,435 | Millar et al. | Aug. 22, 1961 |

OTHER REFERENCES

Nuclear Power, April 1958, pages 152–156.